United States Patent

Johnston et al.

[15] 3,662,375

[45] May 9, 1972

[54] SHIFT REGISTER DISPLAY

[72] Inventors: David L. Johnston; Paul E. Nelson, both of Rochester, Minn.

[73] Assignee: International Business Machines Corporation, Armonk, N.Y.

[22] Filed: Jan. 10, 1969

[21] Appl. No.: 790,221

[52] U.S. Cl. ..........................340/324 A, 178/15, 340/146.3

[51] Int. Cl. ..........................G06f 3/14

[58] Field of Search........................340/324.1, 324 A, 146.3; 178/15, 30, 6

[56] References Cited

UNITED STATES PATENTS

| | | | |
|---|---|---|---|
| 3,182,308 | 5/1965 | Dutton et al. | 340/324.1 |
| 3,343,030 | 9/1967 | Dragon et al. | 340/324.1 |
| 3,382,487 | 5/1968 | Sharon et al. | 340/324.1 |
| 3,403,286 | 9/1968 | Carlock et al. | 340/324.1 |
| 3,408,458 | 10/1968 | Hennis | 178/15 |
| 3,210,729 | 10/1965 | Lozier, Jr. et al. | 340/146.3 |
| 3,428,852 | 2/1969 | Greenblum | 340/324 |
| 3,555,538 | 1/1971 | Henderson et al. | 340/324 |

*Primary Examiner*—John W. Caldwell
*Assistant Examiner*—Marshall M. Curtis
*Attorney*—Sughrue, Rothwell, Mion, Zinn & Macpeak

[57] ABSTRACT

The contents of a matrix-type shift register used in an optical character reader is displayed on command on a cathode ray tube. Display is accomplished by generating a raster pattern scan for each storage position of the shift register, said raster pattern scans being at the same relative positions to one another as the storage positions in the shift register. Each raster pattern scan, referred to as a cell raster, is intensified if the corresponding shift register storage cell contains a video or "black bit." If the storage cell does not contain a black bit, the corresponding cell raster is not intensified. A partial outline of all cell rasters may be intensified to provide a visual indication of all cell positions. The resulting pattern displayed by the cathode ray tube is a configuration which corresponds to the configuration of black bits held in the shift register.

4 Claims, 9 Drawing Figures

INVENTORS
DAVID L. JOHNSTON
PAUL E. NELSON

BY

Sughrue, Rothwell, Mion, Zinn & Macpeak
ATTORNEYS

SHIFT REGISTER & READ OUT CIRCUIT

SHIFT REGISTER DISPLAY LOGIC

CELL CNTR CONTROL LOGIC

SHIFT REGISTER DISPLAY

BACKGROUND OF THE INVENTION

The invention is in the field of optical reader systems and specifically is a method and apparatus for visually displaying the contents of a shift register.

In many well known types of optical reader systems, a beam is caused to scan back and forth across a character on the document being read. A timing means divides each excursion into discrete portions or bits and a detector generates video or black bits when the beam intersects the character being scanned. The bits are shifted into a matrix-type shift register which at the end of the scan of a single character contains a black bit pattern which corresponds to the configuration of the character being scanned. Subsequently, recognition logic operates on the contents of the shift register to determine the identity of the character scanned.

Very often it is necessary and desirable to provide a visual indication of the black bit pattern held in the shift register. In the past, this has been accomplished by a matrix of light sources each connected to a corresponding storage cell in the shift register. The light pattern created by the matrix of light sources in response to the contents of the shift register visually represents the pattern of black bits held in the shift register.

SUMMARY OF INVENTION

In accordance with the present invention, the matrix of light sources and the cables necessary to connect the light sources to the shift register are eliminated by providing a visual display of the contents of the shift register on a cathode ray tube. Since a cathode ray tube is ordinarily a necessary part of the optical reader apparatus, a significant cost savings is achieved by providing a display on the display CRT rather than on a separate matrix of light sources. When the shift register display apparatus is turned on, the cathode ray tube beam enters a SEEK mode and is deflected to an initial SEEK point which is a preestablished reference point on the face of a cathode ray tube. The beam then enters a shift register display mode and performs a small raster pattern scan, hereinafter referred to as a cell raster, for each storage cell in the first column of the shift register. The cell rasters are positioned in columnar form thereby corresponding in position to the storage cells in the first column of the shift register. During each cell raster, the beam intensity is controlled by the contents of the corresponding storage cell of the shift register. That is, if the corresponding storage cell contains a black bit, the raster will be intensified thereby creating a visual raster on the screen, whereas if the corresponding storage cell does not contain a black bit, the cell raster will not be intensified and will not be visible.

When all of the cell rasters for the first column have been completed, the beam then re-enters the SEEK mode at which time it is deflected to a shifted SEEK point. The shifted SEEK point is vertically the same as the original SEEK point but is horizontally shifted from the original SEEK point by a predetermined horizontal distance. The predetermined horizontal distance is sufficient to place a small separation between columns of cell rasters. When the shifted SEEK point is reached, the beam re-enters the display shift register mode and generates cell rasters corresponding to the second column of the shift register. The latter operation continues until all of the cell rasters, corresponding to all of the storage cells in the shift register, have been completed. In order to provide a visual indication of the position of all cell rasters, a portion of the outline of each cell raster may be intensified whether or not the corresponding storage cell contains a black bit.

DETAILED DESCRIPTION OF THE DRAWINGS

Figure 1:
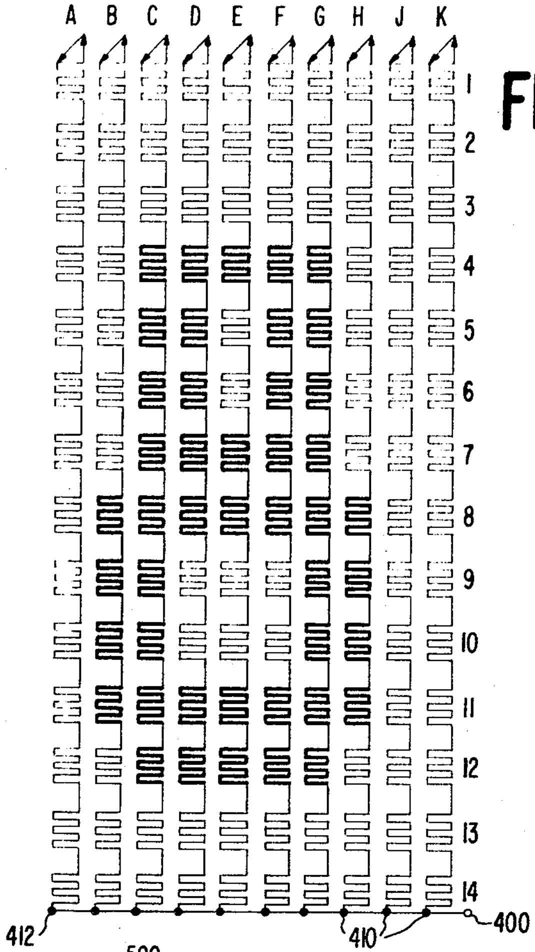
FIG. 1 illustrates an example of a pattern which is generated on the face of a cathode ray tube in accordance with the present invention and also illustrates the path of the beam in accordance with the present invention.

In the specific embodiment described herein, it will be assumed that the contents of a 140 position shift register are to be displayed on the face of a cathode ray tube. The 140 position shift register has 10 columns designated respectively, A, B, C, D, E, F, G, H, J, K, and each column has fourteen storage cells designated respectively 1 through 14. FIG. 1 represents the display that would be generated on the face of the cathode ray tube with the exception that the lighter areas would not necessarily be visible. The light areas as well as the dark or intensified areas are illustrated in FIG. 1 for the purpose of showing the pattern traveled by the cathode ray tube beam. The intensified areas or cells represent the display which would be generated assuming the shift register contains black bits in storage cells corresponding to the character eight.

The overall beam pattern of FIG. 1 is divided into 140 cells corresponding to the 140 storage cells of the shift register. The columns are labeled A through K and the rows are labeled 1 through 14, also corresponding to the columns and rows of the shift register. When operation of the shift register display is initiated, the beam seeks out the SEEK point 400 which is near the lower right of the overall pattern. The SEEK point 400 is an arbitrary starting point for display of the shift register contents. After the SEEK point is reached, the beam then performs a raster pattern scan within each cell location. The first raster pattern scan corresponds to cell location K14, the second raster pattern scan corresponds to cell location K13, the third raster pattern scan corresponds to cell location K12, etc. During each cell raster, the beam intensity is controlled by the bit stored in the corresponding storage cell of the shift register. If the corresponding storage cell of the shift register contains a black bit, the beam will be intensified, e.g. cell H11, but if the corresponding cell location does not contain a black bit, the cell raster will not be intensified, e.g. cell K14.

After all cell rasters have been generated for one complete column, the beam re-enters the SEEK mode and is directed down and to the left toward a shifted SEEK point 410. After generation of the cell rasters for column K, the shifted SEEK point 410 corresponds to the lower left of the cell rasters for column K. Once the shifted SEEK point is reached, the cell rasters for column J are generated in the same manner as described above for column K. This operation continues for all cells in all columns until 140 cell rasters have been generated. The resulting visual pattern on the face of the display CRT represents the pattern of black bits stored in the shift register.

Figure 1A:
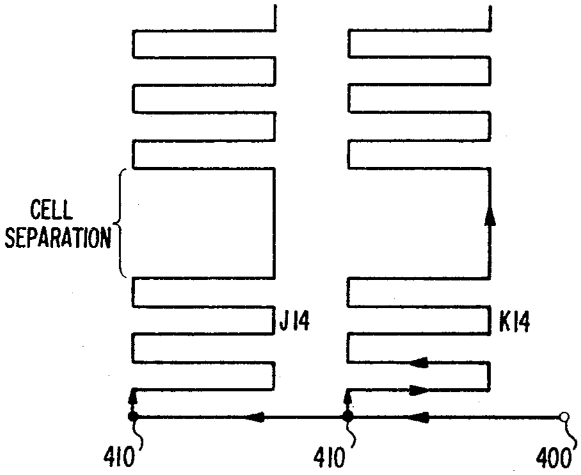
FIG. 1A is a blow-up of two of the cell rasters of FIG. 1.

FIG. 1A shows a blow-up of the cell rasters K14 and J14. As can be seen from this Figure, each cell raster comprises 6 horizontal scans, alternating between left movements and right movements, with a short upward scan between each of the horizontal scans. At the end of the sixth horizontal scan, corresponding to the end of the cell raster, the beam moves up a larger distance to start generation of the next succeeding cell. In the specific example described herein, the beam is caused to move, during generation of the cell raster, 5 mils per microsecond in the horizontal direction and 1 mil per microsecond in the vertical direction. In between cell rasters, the beam is caused to move vertically at 5 mils per microsecond. On a time basis, as controlled by system clocking, the beam moves horizontally for two counts and vertically for one count. The distance between original SEEK point 400 and the shifted SEEK point 410 in FIG. 1A represents the horizontal shift in the two SEEK points. Note that there is no vertical difference between SEEK 400 and SEEK point 410 and consequently a constant vertical reference can be used for finding all SEEK points.

Figure 2:
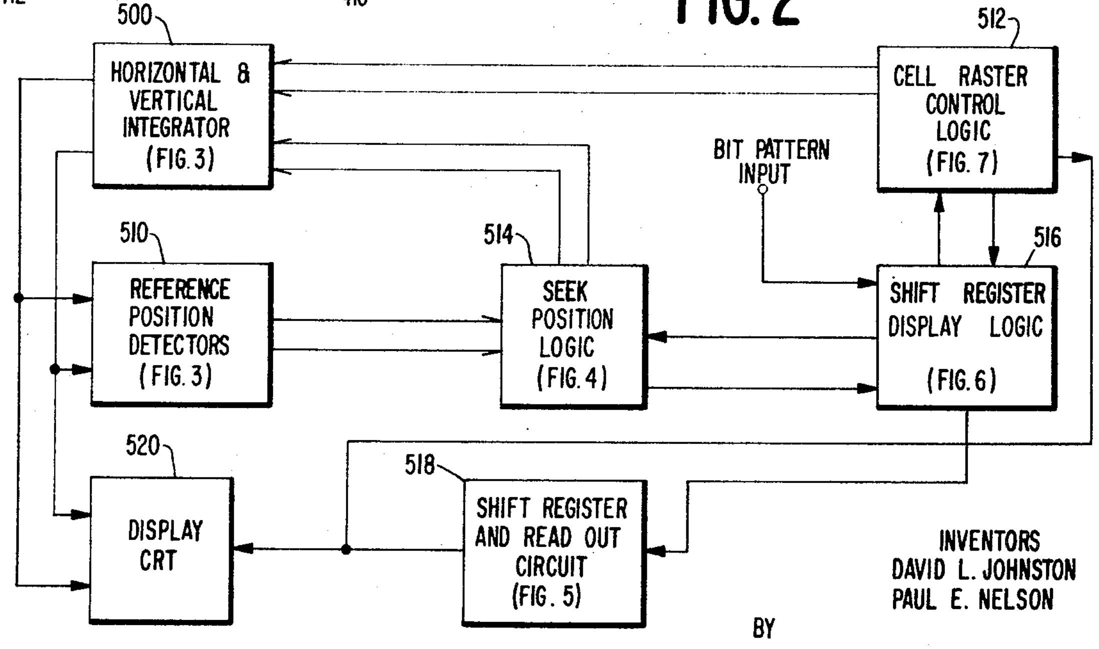
FIG. 2 is a general block diagram of a preferred embodiment of apparatus which is capable of carrying out the method of the present invention.

A system for generating the pattern illustrated in FIG. 1 is shown in FIG. 2. The display is initiated by a switch in the shift register display logic 516. The shift register display logic 516 sends a signal to the SEEK position logic 514 which operates to generate signals that cause the beam to move to the original SEEK point. These signals are supplied to the horizontal and vertical integrators 500 which in turn drive the horizontal and vertical deflection controls of a display CRT 520. The position of the cathode ray beam, both horizontally and vertically, is monitored by a reference position detector 510 which is connected to the horizontal and vertical outputs of the horizontal and vertical integrators 500. The reference position detector 510 provides control signals to the SEEK position logic 514 indicating whether or not the beam is at the SEEK point. When the beam reaches the SEEK point, the SEEK position logic 514 sends a control signal to the shift register display logic 516 which in turn enables the cell raster control logic 512.

The cell raster control logic operates to generate control signals which cause the beam to generate the cell rasters for an entire column. Each time a column of cell rasters has been completed, the cell raster control logic 512 sends a control signal to the shift register display logic 516 and the shift register display logic enables the SEEK position logic 514 to cause the beam to move to a shifted SEEK point. In this manner, control of beam movement is alternated between the SEEK position logic and the cell raster logic for the purpose of alternately seeking the SEEK points and generating the cell rasters. The control signals generated by the cell raster control logic are also applied to the horizontal and vertical integrators 500 thereby causing the beam to move in the controlled manner.

The shift register display logic 516 also controls shifting of the shift register and read out circuit 518, whose contents is being displayed. The shift register and read out circuit 518 controls the intensity of the display CRT 520. The control of position K14 of the shift register is used for intensity control and each time the contents of the shift register are shifted a new storage cell controls the intensity of the display CRT. A further input to the intensity grid of the display CRT 520 from the cell raster control logic 512 intensifies a partial outline of each cell raster to make it possible to distinguish between a full and empty register.

The Figure numbers in each of the blocks of FIG. 2, with the exception of the display CRT 520, correspond to the Figures in which the logic details of that block are illustrated. The display CRT is conventional and therefore is not shown in any detail herein. It will be apparent to anyone of ordinary skill in the art to which the invention pertains that the system of FIG. 2 may be used in conjunction with an optical reader system of the type which uses a shift register to store black bits corresponding to beam intercepts with a character being scanned. Also, in such circumstances, the display CRT 520 may be the ordinary display CRT which is a part of the optical reader system.

Figure 7:
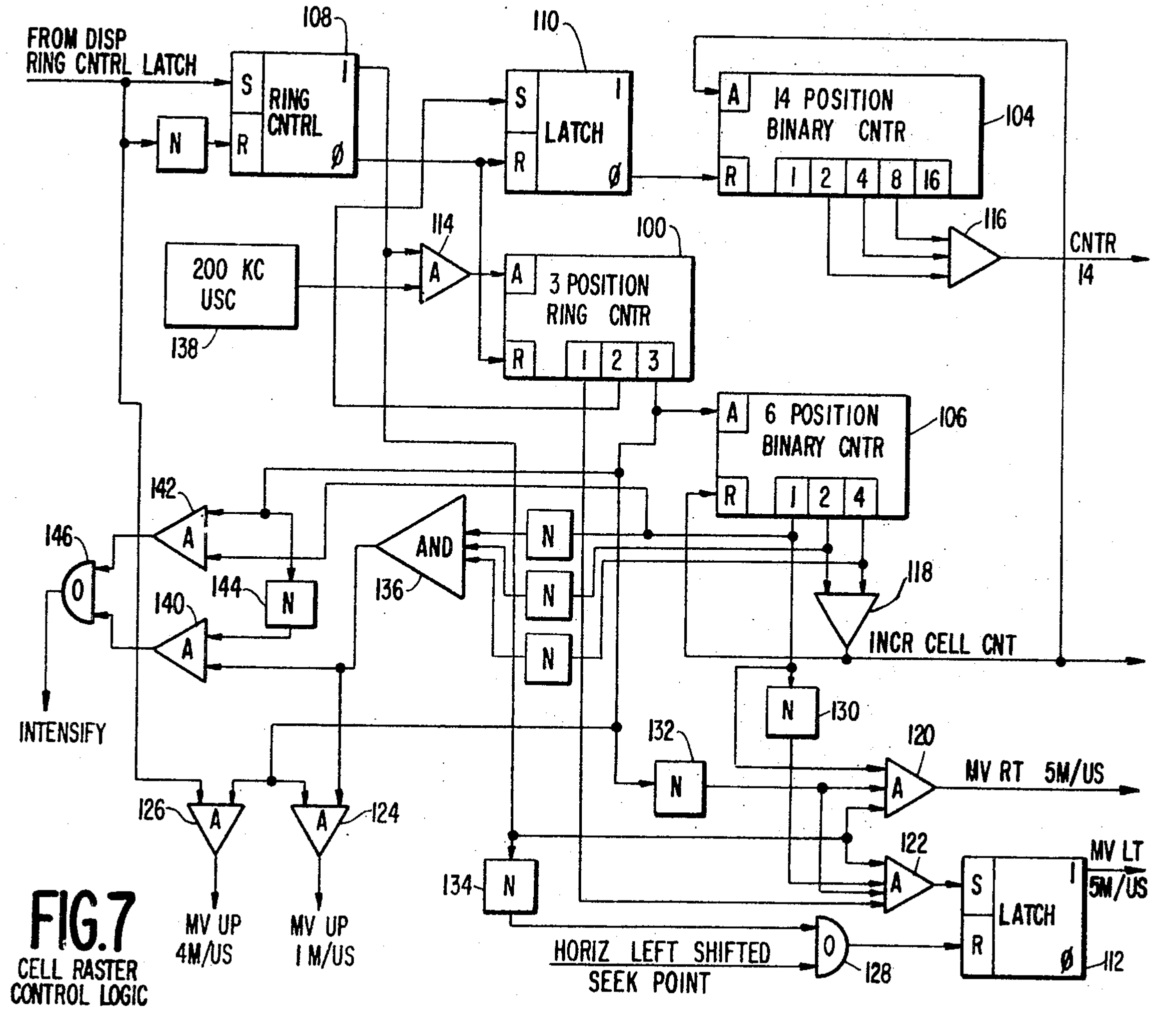
Figure 8:
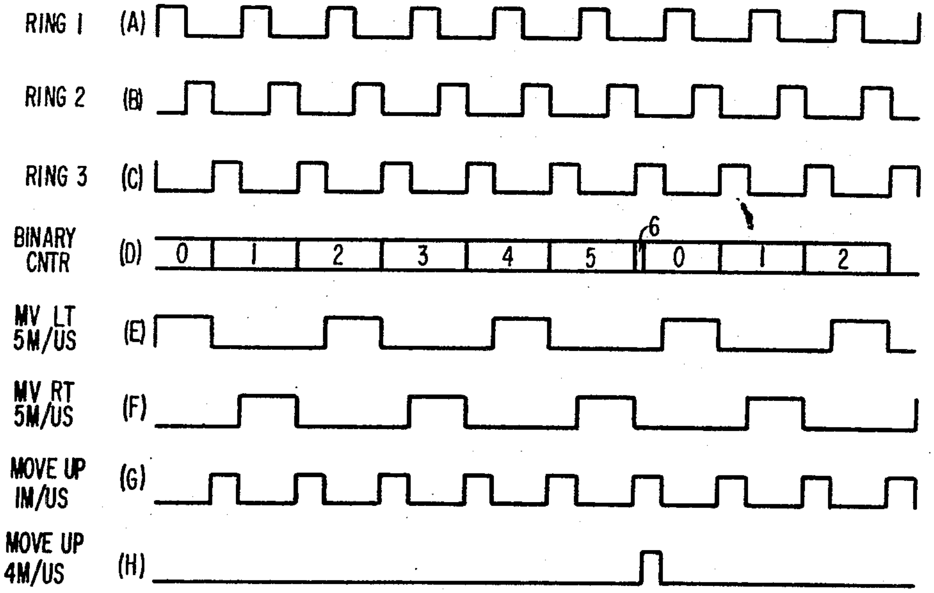
FIG. 8 is a timing diagram showing the time of occurrence of certain events in connection with the logic of FIG. 7.

The details of the cell raster control logic 512 of FIG. 2 are illustrated in FIG. 7, and the waveforms shown in FIG. 8 are helpful in understanding the operation of the cell raster control logic. The logic comprises counters 100 through 106, latches 108 through 112, AND gates 114 through 126, OR gate 128, INVERT gates 130 through 134, NAND gate 136, and CLOCK OSCILLATOR 138. The 14 position binary counter 104 keeps track of the cells in which the raster pattern is being generated and generates an output when an entire column is finished. The 6 position binary counter 106 keeps track of the horizontal sweeps within each cell raster and generates an INCREMENTAL CELL COUNT output when the individual cell raster is complete. The three position ring counter 100 controls beam movement during each cell raster. During rings 1 and 2 of ring counter 100, the beam is caused to move horizontally at 5 mils per microsecond, alternating between right movement and left movement. During ring 3, the beam is caused to move up at 1 mil per microsecond with the exception that after a cell raster has been completely generated, the beam is caused to move up at the faster rate of 5 mils per microsecond.

In FIG. 8, the waveforms *a*, *b*, and *c* represent the rings 1, 2 and 3 of the three position ring counter 100. Waveform *d* represents the count in the six position binary counter 106 and the waveforms *e* through *h* represent respectively the times at which the beam is moved right, left, up at 1 mil per microsecond and up at 4 mils per microsecond.

Figure 6:
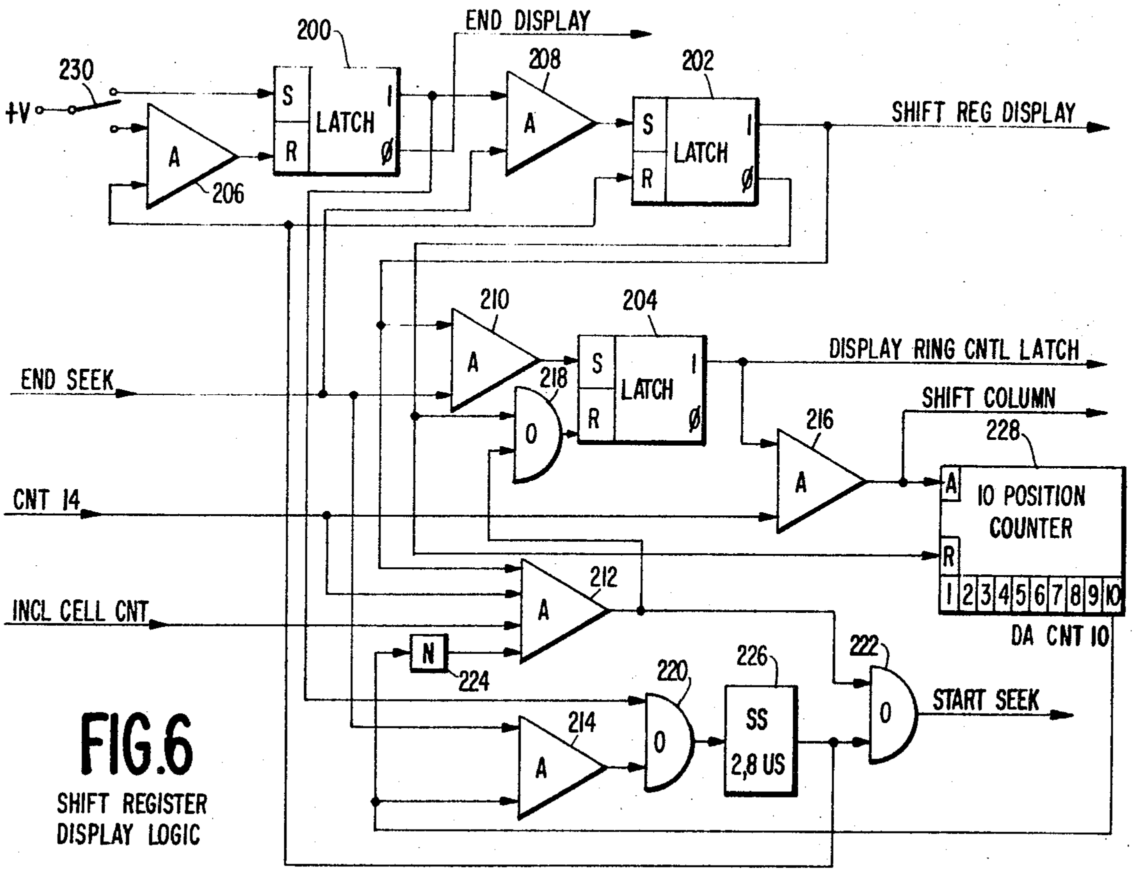

The cell raster control logic is energized by a logic input from the shift register display logic 516 shown generally in FIG. 2 and in detail in FIG. 6. Specifically, the input comes from a display ring control latch 204 (FIG. 6) and serves to set the ring control latch 108. When set, the ring control latch 108 energizes AND gate 114 thereby passing the clock pulses from oscillator 138 to the three position ring counter 100 causing the latter counter to count as indicated in waveforms *a*, *b* and *c* of FIG. 8. The ring 3 pulses from counter 100 are applied to the accumulation input of the six position binary counter 106 thereby advancing binary counter 106 once each full cycle of ring counter 100. Since counter 106 is a binary counter, the one position output therefrom will be on every other count, and this one position of the binary counter 106 is used to alternate horizontal movements of the beam between moves to the right and moves to the left. As seen by the drawing, when the one position of counter 106 is at a down level, the AND gate 122 can be energized to initiate a beam movement left whereas when the one position of the counter 106 is at an up level, the AND gate 120 can be energized to initiate a beam movement to the right.

When the three position ring counter 100 first starts counting, the upper input to AND gate 122 will be energized via the invert gate 130, the middle input to AND gate 122 will be energized via the INVERT gate 132, and the lower input of AND gate 122 will always be energized as long as the ring control latch 108 is in the set condition. Thus, during the counts of ring 1 and ring 2, AND gate 122 will be fully enabled and will set latch 112 and will provide an output command, MOVE LEFT 5M/US, which is applied to the integrator 500 (FIG. 2) to cause the beam to move left at the rate of 5 mils per microsecond.

When ring count 3 occurs, the AND gates 120 and 122 will be inhibited via INVERT gate 132. The six position binary counter 106 will be advanced and the AND gate 126 will be energized causing the beam to move up at the rate of 1 mil per microsecond.

The move Left latch 112 will be reset by BEAM LEFT OF HORIZONTAL LEFT SHIFTED SEEK POINT. On the first sweep left, the signal resetting latch 112 comes up during ring count 3 time and on all other left sweeps the signal will come up just prior to ring count 3 time. The HORIZONTAL LEFT SHIFTED SEEK POINT signal level terminates all leftward scans insuring straight vertical columns.

At the next ring 1 count, AND gate 126 will be inhibited thereby stopping the upward movement, and the AND gate 120 will be energized causing the beam to move right at the rate of 5 mils per microsecond. The beam continues to move right until ring count 3 occurs thereby stopping the right beam movement. As in all cases, ring 3 advances the six position binary counter 106 and causes an upward movement of 1 mil per microsecond via AND gate 126. The beam thus is caused to move to the left and up, then to the right and up, then to the left and up, etc., until the sixth horizontal movement has been completed. During the sixth horizontal movement, the six position binary counter will register a count of 5 during rings 1 and 2, at which time the beam will be moving to the right at 5 mils per microsecond. When ring 3 occurs, the six position binary counter 106 will advance to a count of 6. As soon as the count of 6 is registered, AND gate 118 is energized, thereby resetting the binary counter 106 to the count of zero. This creates a short duration output pulse from the AND gate 118 which is referred to as the INCREMENT CELL COUNT pulse. The INCREMENT CELL COUNT pulse indicates that the cell raster is complete and it is time to go on to the next cell.

The INCREMENT CELL COUNT pulse advances the 14 position binary counter 104 which keeps track of the cells being displayed. The INCREMENT CELL COUNT pulse is also applied to the shift register and read out circuit 518 (FIG. 2) to shift the contents of the shift register by one position thereby enabling the succeeding position in the shift register to control the beam intensification for the next cell raster.

The short period during which the 6 position binary counter registers a count of 6 is illustrated generally by the binary counter waveform (D) in FIG. 8. Since the count of 6 is only held for a very short time, the counter reverts to the count of zero while the ring 3 pulse still exists. With all positions of binary counter 106 at zero, the NAND gate 136 is energized causing AND gate 126 to generate a MOVE UP 4M/US command signal. Also at this time, AND gate 124 will be energized thereby generating a MOVE UP 1M/US command signal. As a result, the beam is caused to move up at the rate of five mils per microsecond when it is traveling from cell to cell, whereas it only moves up at 1 mil per microsecond during the generation of the cell raster. The next cell raster is initiated as soon as the next ring 1 pulse occurs.

The AND gates 140 and 142, the INVERT gate 144, and the OR gate 146 operate to intensify the bottom and one side of each cell raster thereby providing a visual indication of each cell irrespective of the corresponding bit in the 140 position shift register. AND gate 140 is energized during the initial horizontal sweep of each cell raster whereas AND gate 142 is energized every other up sweep during the cell raster period.

The 14 position counter 104, as stated above, keeps track of the number of cell rasters generated. When the 14th cell raster is generated, the AND gate 116 provides a CNTR 14 output which indicates that a column of cell rasters has been generated and it is time to enter the SEEK mode. The counter 104 is reset to zero whenever the ring control latch 108 is reset. The counter is held at reset until the next ring 2 pulse occurs.

The shift register display logic 516 of FIG. 2, which is illustrated in detail in FIG. 6, operates to turn on the SEEK position logic 514 (FIG. 2) and the cell raster control logic 512 (FIG. 2) at the proper times. The shift register display logic comprises latches 200 through 204, AND gates 206 through 216, OR gates 218 through 222, INVERT gate 224, single shot 226, a 10 position counter 228, and a switch 230. The operation of the overall system is started by moving the arm of switch 230 to make contact with the set input of latch 200. When placed in the set condition, latch 200 provides an output through OR gate 220 to the single shot 226 which provides a 2.8 microsecond pulse through OR gate 222 to start the SEEK operation.

When the SEEK operation is completed, an END SEEK signal from the SEEK position logic 514 (FIG. 2) passes through AND gate 208 and sets the latch 202. Latch 202 remains set until one full display of the shift register contents is completed. Until the overall system is turned off by resetting latch 200, the latch 202 remains set except when seeking the original SEEK point. The output therefrom is applied to the seek position logic 514 (FIG. 2) to distinguish between seeking the original seek point and the shifted SEEK points. The logic output from latch 202, referred to as SHIFT REG DISPLAY, also sets latch 204 via AND gate 210. The latch 204 provides the display ring control latch signal which enables the cell raster control logic described in detail above. The cell raster control logic (FIG. 7) operates, as discussed above, to generate the cell rasters for an entire column of the shift register at which time it generates a CNT 14 signal. The CNT 14 signal passes through AND gate 216 to the accumulation input of the 10 position counter 228. The 10 position counter 228 keeps track of the columns of the 140 position shift register being displayed. The counter 228 will reach the count of 10 after the tenth column has been displayed thereby generating a DA CNT 10 output signal. The signal DA CNT 10, indicating the completion of a full display, either initiates a subsequent full display or turns off the system depending upon the position of switch 230. If switch 230 is connected to the upper terminal a subsequent full display will be initiated. Just prior to the occurrence DA CNT 10, the CNT 14 signal will have started the SEEK operation via AND gate 212 and OR gate 222. This is the final shifted SEEK operation and corresponds to the beam excursion 412 shown in FIG. 1. It will be noted that the final shifted SEEK operation takes place regardless of the position of switch 230.

Following the final shifted SEEK operation an END SEEK signal occurs. The END SEEK signal passes through AND gate 214, which is enabled by DA CNT 10, and through OR gate 220 to the single shot 226. The 2.8 ms pulse from single shot 226 starts the SEEK operation again via OR gate 222 and also resets 202. Thus a new SEEK mode will be entered immediately following the final shifted SEEK point operation. However, since latch 202 is reset the SEEK position logic (FIG. 4), in a manner to be described in detail hereafter, seeks the original SEEK point thereby placing the beam at the position where the subsequent full display can start.

If the control switch 230 had been in the off position, connected to the lower terminal, the 2.8 ms pulse from single shot 226 would reset latch 200 as well as latch 202 thereby turning off the system.

The logic signal CNT 14 is also applied as one input to the AND gate 212, the other inputs coming from latch 202, INVERT gate 224, and INCR CELL CNT. The latter conditions occur in coincidence at the end of a column which is not the tenth column. When AND gate 212 is energized, it starts a SEEK operation via OR gate 222.

Figure 5:
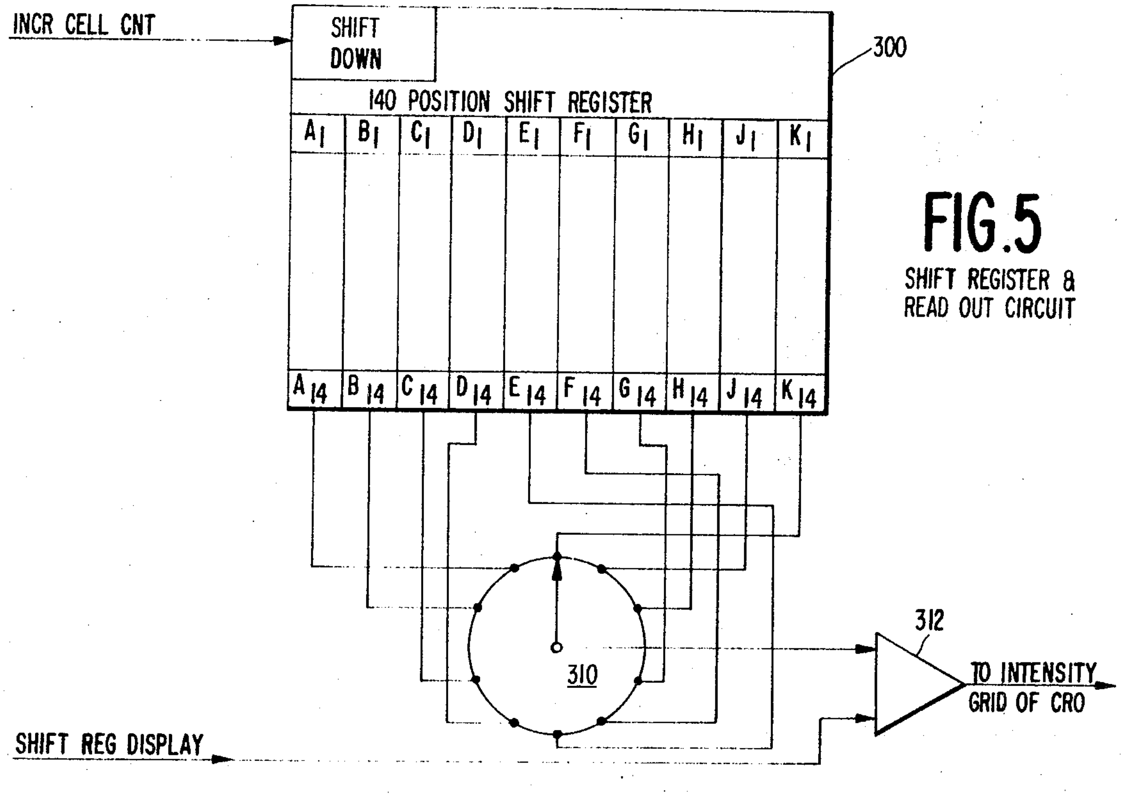

The shift register and read out circuit 518 of FIG. 2 is illustrated in detail in FIG. 5, and comprises a 140 position shift register 300, a 10 position rotary switch 310 and an AND gate 312. The shift register 300 is a 10 × 14 shift register, i.e., it has 10 columns, A through K, and 14 stages within each column, 1 through 14. Each column operates in a fashion of a serial shift register having the 14th stage connected back around to the first stage. In the optical character reader art, the video or "-black bits" stored in the shift register stages is in a pattern which corresponds to the configuration of the character being read by the optical character reader apparatus. The manner in which these "black bits" are entered into the shift register is of no concern to the present invention, but it is well known to anyone of ordinary skill in the art that matrix-type shift registers are often used in this manner to store the black bits.

When the shift register is being displayed, the output of bit K14 is looped back to the input of A1. Thus, after one hundred and forty advances (INCR CELL CNT, FIG. 7) the information that was in K14 at the start of the display cycle will be in K14 at the end of the display cycle. If any position of the register isn't working, the contents of the register cannot be displayed. Switch 310 is used as a fault location aid when these failures occur. The register will appear to contain all white or all black bits when a failure occurs depending on the type of failure. The normal position for switch 310 is in the K14 position. If a register failure has occurred and the register appears to contain all black information, switch 310 should be varied one position at a time clockwise, K14 to J14, J14 to H14, etc., until the register appears to contain all white bits. The last switch setting which made the register appear to contain all black bits indicates the matrix column containing the faulty register position. Fault location within the column would be done with conventional apparatus, such as an oscilloscope. Similarly, if the register appears all white, a diagnostic means is provided to insert a continuous stream of black bits into position A1 of the register. Varying the switch setting as described above will yield a switch setting position which causes the register to appear all black. The last switch setting which made the register appear all white indicates the matrix column containing the faulty register position.

Figures 3, 4:
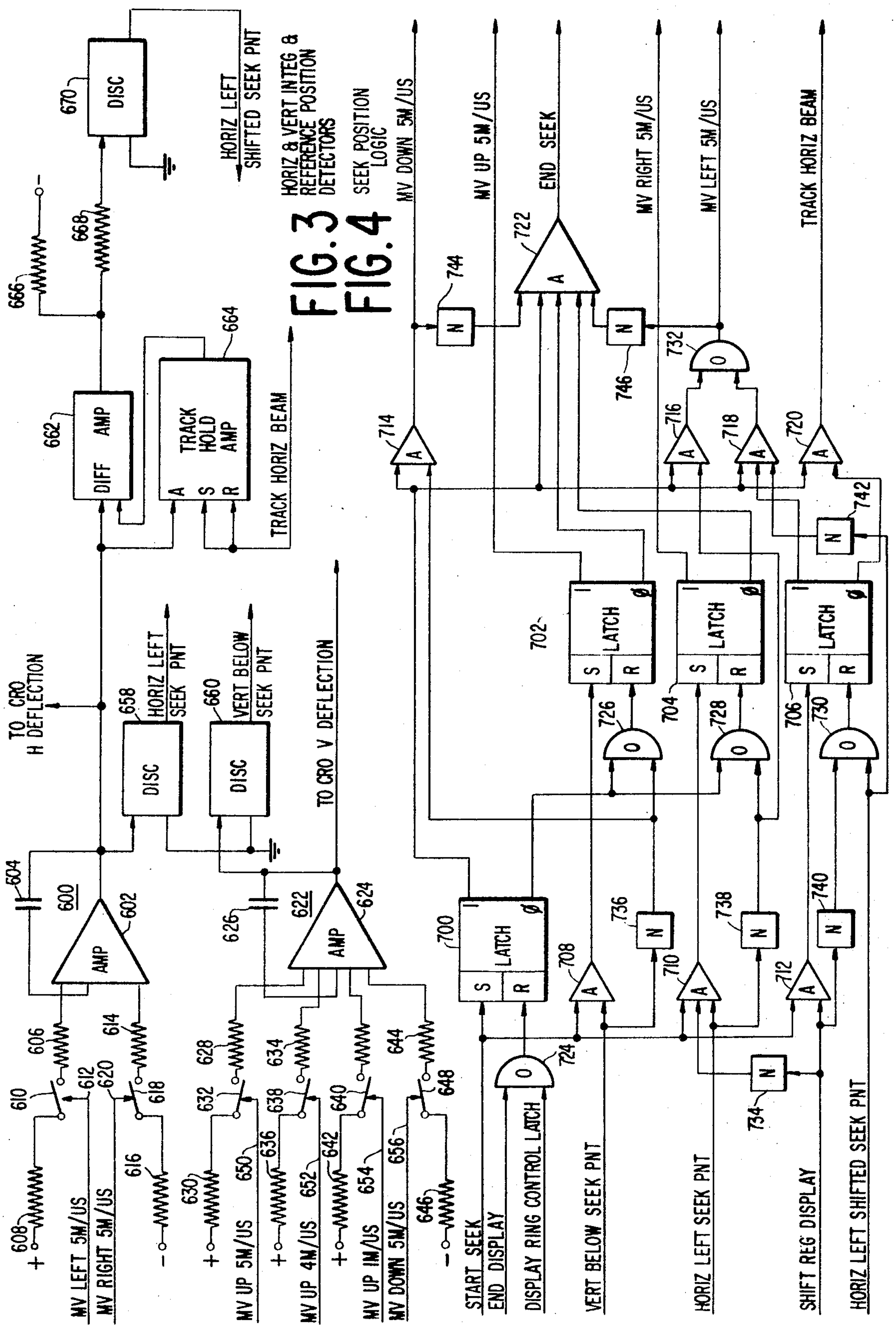
FIGS. 3 through 7 are block diagrams showing details of the logic circuitry which makes up the blocks of the embodiment of FIG. 2.

The horizontal and vertical integrators as well as the reference position detector are shown in detail in FIG. 3 wherein the horizontal and vertical integrators comprise integrators 600 and 622 with their associated circuitry, and the reference position detector comprises discriminators 658, 660, and 670, differential amplifiers 662, track hold amplifier 664, and a voltage divider comprising resistors 666 and 668. The integrators 600 and 622 operate in a well known manner to generate voltages which are applied to the horizontal and vertical deflection drivers, respectively, of the display CRT 520. The voltages control horizontal and vertical deflection of the beam and are proportional to the beam position. Horizontal integrator 600 comprises operational amplifier 602, feedback capacitor 604, and a pair of input circuits. The first input circuit comprises resistors 608 and 606, current switch 610 and control input 612. The second input comprises resistors 616 and 614, current switch 618, and control input 620.

Resistors 608 and 606 as well as the voltage applied to resistor 608 are selected, in a well known manner, so that when switch 610 is closed, the output of the amplifier will vary at a rate which causes horizontal deflection of the beam to the left at the rate of 5 mils per microsecond. Thus, the logic up level signal on control input 612 is referred to as the MOVE LEFT 5M/US. The other input circuit is arranged so that when switch 618 is closed the amplifier output varies at a rate and at a direction to cause beam deflection to the right at the rate of 5 mils per microsecond. The logic up level signal on control input 620 closes switch 618 and is referred to as MOVE RIGHT 5M/US. The MOVE LEFT and MOVE RIGHT logic signals are generated by either the cell raster control logic 512 or the SEEK position logic 514 of FIG. 2.

The vertical integrator 622 comprises operational amplifier 624, feedback capacitor 626, and four input circuits. Each of the input circuits to amplifier 624 is similar in nature to the input circuits to the amplifier 602. The resistors and voltages are selected to cause movements of the beam in the directions indicated by the labeling of the logic signals on control inputs 650,652,654 and 656.

The horizontal deflection voltage for integrator 600 is applied to discriminator 658 and the vertical deflection voltage from integrator 622 is applied to discriminator 660. The discriminators 658 and 660 are set so that they provide up level logic signal outputs when the horizontal and vertical deflection voltages, respectively, are above predetermined values. These predetermined values determine the location of the original SEEK point both horizontally and vertically. The up level logic signal from discriminator 658, referred to as HORIZONTAL LEFT SEEK POINT appears whenever the beam is to the left of the original SEEK point. The logic up level signal from discriminator 660, referred to as VERTICAL BELOW SEEK POINT, appears whenever the beam is below the original SEEK point.

The differential amplifier 662, track hold amplifier 664, and discriminator 670 operate to control the horizontal position of the shifted SEEK points and to generate a logic up level signal referred to as horizontal LEFT SHIFTED SEEK POINT whenever the beam moves to the left of the shifted SEEK point. Track hold amplifiers such as the track hold amplifiers 64 are known in the art and operate in two modes. During a track mode, they track the signal which is applied to the A terminal and during a hold mode they stop tracking and store the signal which is at the A terminal when the hold mode was initiated. Tracking is controlled by applying a logic up level signal to the S and R terminals of the track hold amplifier 664. Thus, when a track horizontal beam signal is applied to the S and R inputs of track hold amplifier 664 the amplifier tracks the horizontal deflection voltage from horizontal integrator 600. The tracked voltage is applied as one input to the differential amplifier 662, the other input being taken directly from the horizontal integrator 600. Consequently, during the track mode of operation the output of the differential amplifier will be zero. During the hold mode of operation the output from differential amplifier 662 will not necessarily be equal to zero because the input from the horizontal integrator 600 may vary. When the output from the differential amplifier 662 reaches a predetermined level set by the voltage divider resistors 666 and 668, the discriminator 670 will provide a logic up level signal at its output.

Functionally, the track hold amplifier 664 holds a voltage corresponding to the horizontal position of the previous SEEK point. When the horizontal deflection voltage from the horizontal integrator 600 rises above the held voltage by an amount predetermined by the voltage divider resistors 666 and 668 the discriminator 670 will provide its output. The predetermined voltage corresponds to the horizontal distance between adjacent SEEK points. Thus, the output from discriminator 670 indicates that the shifted SEEK point has been reached. The TRACKED HORIZONTAL BEAM signal which is supplied to the S and R terminals of the track hold amplifier 664 to cause holding of the horizontal deflection voltage is present during the generation of the cell rasters but is absent during part of the SEEK mode. Consequently track hold amplifier 664 holds during generation of the cell rasters and tracks during part of the SEEK mode. The signals from discriminators 658, 660 and 670 are applied to the SEEK position logic 514 (FIG. 2) to inform the SEEK position logic whether or not the beam has reached the desired SEEK point.

The SEEK position logic is shown in detail in FIG. 4 and comprises latches 700 through 706, AND gates 708 through 722, OR gates 724 through 732, and INVERT gates 734 through 748. The input logic signals shown on the left of the drawing come from the shift register display logic (FIG. 6), and the reference position detection (FIG. 2).

The latch 700 is set in response to a start SEEK signal from the OR gate 222 of the shift register display logic illustrated in detail in FIG. 6. The start SEEK signal also is applied to one input of each of the AND gates 708, 710, and 712. The set output from latch 700 is applied as one input to each of the AND gates 714, 716, 718, 720 and 722. The AND gate 714 controls down movement, the AND gates 716 and 718 control left movement, the AND gate 708 controls up movement, and the AND gate 710 controls right movement.

Vertical movement of the beam during the SEEK mode is controlled in response to the VERTICAL BELOW SEEK POINT signal derived from discriminator 660 (FIG. 3). The latter signal controls for the original SEEK point and for all shifted SEEK points since the vertical position of all SEEK points is identical. If the beam is below the SEEK point, MICROSECOND gate 708 will be fully energized thereby setting latch 702. When in the set condition, the latch 702 generates a MOVE UP AT 5 MILS PER MICROSECOND command signal. As the beam moves up and reaches the SEEK point level, the input to AND gate 708 drops out thereby resetting latch 702 and removing the MOVE UP command signal. Resetting of latch 702 is accomplished via INVERT gate 706 and the OR gate 726. The output from INVERT gate 706 also fully enables AND gate 714 thereby generating a MOVE DOWN AT 5 MILS PER microsecond command signal. However, since the beam has just moved above the SEEK point, the move down command signal will only last for an extremely short period of time because any amount of movement in the down direction causes the generation of the VERTICAL BELOW SEEK POINT signal thereby disabling AND gate 714. It will be noted that the subsequent generation of the VERTICAL BELOW SEEK POINT signal does not enable AND gate 708 because the START SEEK SIGNAL only lasts for a short period of time. It will also be noted that the only time the beam is likely to be below the SEEK point is during the initial seek operation when the system is first turned on. During all subsequent SEEK operations, the beam will be at the top of the column which is much above the vertical level of the SEEK point.

If the beam is above the SEEK point, AND gate 714 will be enabled to generate a MOVE DOWN command signal. When the beam moves down to the SEEK point level, the AND gate 714 will be disabled via the INVERT gate 736.

The logic which controls horizontal movement during the SEEK operation is slightly more complex due to the fact that the SEEK point is shifted after each full column of cell rasters has been generated. During the original SEEK operation, the SHIFT REGISTER DISPLAY signal as discussed above in connection with FIG. 6 will not be present and therefore there will be an output from invert gate 734 thus allowing AND gate 710 to be enabled. During all shifted SEEK operations, the SHIFT REGISTER DISPLAY signal will be present thereby inhibiting AND gate 710. During the initial SEEK operation, assuming that the beam position is to the left of the SEEK point, the AND gate 710 will be enabled and will set the latch 704 thereby generating a MOVE RIGHT command signal. As the beam moves to the right of the SEEK point, the HORIZONTAL LEFT SEEK POINT signal drops out thereby resetting latch 704 via invert gate 738 and OR gate 728 and removing the command MOVE RIGHT signal. The output from INVERT gate 738 also enables AND gate 716 which generates a COMMAND MOVE LEFT signal. However, the leftward movement of the beam will be slight because at that time it will be so close to the SEEK point that almost instantaneously the HORIZONTAL LEFT SEEK POINT signal will be regenerated thereby disabling AND gate 716. If, during the initial SEEK operation, the beam is to the right of the original SEEK point, AND gate 716 will be enabled thereby generating a MOVE LEFT command and will become disabled when the beam reaches the SEEK point.

During all shifted SEEK operations the horizontal movement of the beam will be controlled by AND gate 718. It will be noted that AND gate 716 will be inhibited because the beam will be to the left of the original SEEK point. When SEEK operation other than the original SEEK operation begins, the AND gate 712 sets latch 706 thereby enabling AND gate 718. When gate 718 is enabled, the beam will move left until HORIZONTAL LEFT SHIFTED SEEK POINT is reached and latch 706 is reset. This enables AND 720 causing the trackhold amplifier 664 to track to the shifted level. The track signal will remain up until the bottom of the column is reached. When this occurs, the trackhold amplifier 664 will have been updated to the left side of the previous column to provide a new shifted left position for the left side of the next column to be scanned.

During the SEEK period, when latch 700 is set, and following the removal of all of the command signals such as MOVE UP, MOVE DOWN, MOVE RIGHT and MOVE LEFT, the AND gate 722 will be fully enabled thereby generating and END SEEK signal which is applied to the shift register display logic shown in detail in FIG. 6. The shift register display logic operates to generate a DISPLAY RING CONTROL LATCH signal which turns on the cell raster control logic. The latter signal also resets latch 700 of the SEEK position logic. The latch 700 is also reset by an END DISPLAY signal which occurs when the system is turned off. The latter signal is the reset output of latch 200 of FIG. 6.

We claim:

1. In an optical reader system of the type having a serial shift register which stores black bits corresponding to beam intercepts with a character, said shift register having a fixed number of columns and a fixed number of rows of storage cells, a display cathode ray tube, and means responsive to command input signals for deflecting the beam of said display cathode ray tube in accordance with said commands, the improvement comprising, a. raster control means for generating command signals, applied to said deflecting means, for causing said beam to be deflected in a separate series of cell raster patterns for each column of said shift register, the number of cell raster patterns in each series being equal to the number of rows of said shift register, said raster control means comprising, i. a first counter means having a predetermined count capacity and providing an output pulse once each cycle of said first counter, ii. a second counter means for counting said first counter means output pulses, said second counter means having a predetermined count capacity, iii. means responsive to a predetermined count in said first counter for generating an up command signal which when applied to said deflection means causes said beam to move in a first direction along a first dimension, iv. means responsive to a predetermined number of counts in said first counter every other cycle of said first counter for generating a command signal which when applied to said deflection means causes said beam to move in a first direction along a second dimension at a predetermined rate for the duration of said predetermined number of counts, v. means responsive to a predetermined count in said first counter during alternate cycles of said first counter for initiating a command signal which when applied to said deflection means causes said beam to move in a second direction along said second dimension for the duration of said command signal, and vi. means responsive to said beam reaching a predetermined marginal position in the column of cells being generated for terminating said latter command signal, b. seek means for generating command signals, applied to said deflecting means, for causing said beam to be deflected to a starting point for each separate series of cell raster patterns, c. display intensifying means responsive to the black bits in said shift register for intensifying the cell rasters which correspond to the shift register storage locations containing black bits, and d. control means for alternately enabling said seek means and said raster control means.

2. The invention as claimed in claim 1 further comprising outline intensifying means for intensifying a portion of the outline of each said cell raster pattern.

3. The invention as claimed in claim 1 wherein said display intensifying means comprises, a. means, connecting one storage cell of said shift register to the intensity control grid of said display cathode ray tube, for intensifying said beam when the contents of said one storage cell is a black bit, and b. shifting means responsive to the coincidence of a predetermined count in said first counter and a predetermined count in said second counter for shifting the contents of said shift register to shift into said one storage cell the contents of the storage cell whose cell raster pattern is being formed whereby each shift results in the contents from a new storage cell controlling said beam intensification.

4. The invention as claimed in claim 3 further comprising outline intensifying means for intensifying a portion of the outline of each said cell raster pattern.

* * * * *